Jan. 18, 1938.       C. E. STOW       2,105,676
WINDSHIELD SPRAYER
Filed Aug. 24, 1936
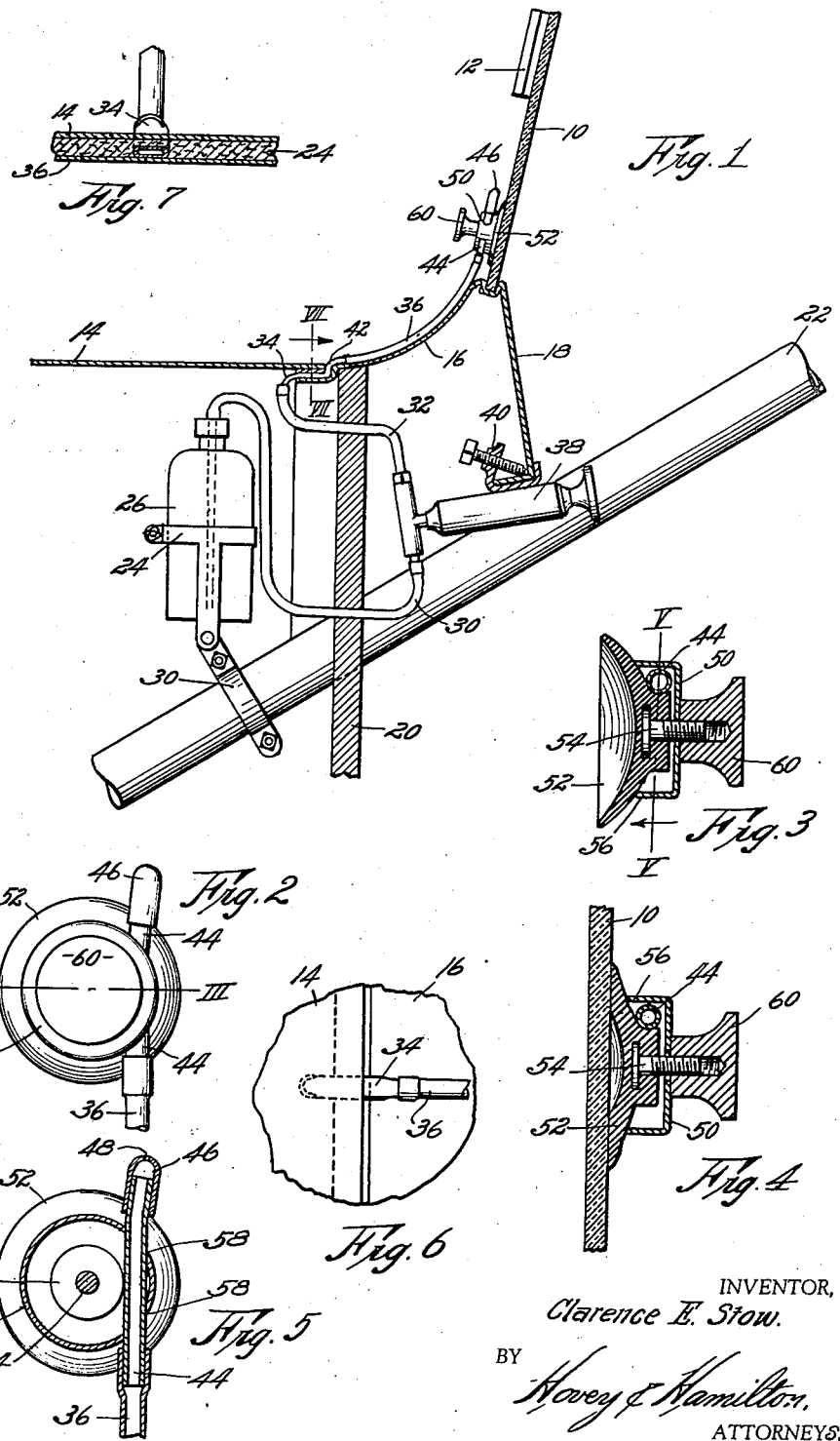
INVENTOR,
Clarence E. Stow.
BY
Hovey & Hamilton,
ATTORNEYS.

Patented Jan. 18, 1938

2,105,676

UNITED STATES PATENT OFFICE 2,105,676

WINDSHIELD SPRAYER

Clarence E. Stow, Kansas City, Mo., assignor to Westoco Products, Inc., a corporation of Missouri Application August 24, 1936, Serial No. 97,566

6 Claims. (Cl. 20—40.5)

This invention relates to automobile windshield cleaning appliances and particularly to the spray nozzle assembly therefor.

The primary object of this invention is to provide a windshield sprayer that may be attached to the automobile without the use of special tools; that is adjustable to direct the liquid onto the windshield; that may be moved and affixed to any surface desired without marring the same and without varying the effectiveness of the sprayer; and that may be quickly attached to the automobile and removed therefrom without marring the finish and without the use of mechanical attaching means.

Another object of this invention is the provision of a nozzle assembly for windshield sprayers, which has as a part thereof, a specially formed pipe line that will pass between the joint formed by the automobile hood and cowl without effecting the joint or forcing the hood out of place.

A yet further aim of this invention is to provide a nozzle assembly for windshield sprayers that includes a suction cup, with means thereon for adjustably supporting a nozzle member so that the same may be moved to direct liquid toward a desired area of the windshield without removing the suction cup.

Further objects of this invention include specific structural elements and combinations thereof which have been built into the unique nozzle per se, and such objects will become apparent during the course of the following specification, referring to the accompanying drawing, wherein:

Figure 1 is a diagrammatical view of the windshield sprayer in place and associated with conventional parts of an automobile.

Fig. 2 is a plan view of the nozzle assembly embodying the invention.

Fig. 3 is a cross sectional view of the same, taken on line III—III of Fig. 2.

Fig. 4 is a similar sectional view through the nozzle assembly, with the same in place on the surface of the windshield.

Fig. 5 is a sectional view through the nozzle assembly, taken on line V—V of Fig. 3.

Fig. 6 is a fragmentary, plan view of a portion of the automobile hood and cowl, with the pipe line in place, and, Fig. 7 is an enlarged, fragmentary, sectional view, taken on line VII—VII of Fig. 1.

The nozzle assembly contemplated by this invention best serves its purpose when associated with structure illustrated and described in my co-pending application Serial No. 19,709, filed May 3, 1935, Auxiliary appliance for windshield wipers, and this application is a continuation in part of the application just identified. The conventional automobile with which the sprayer is used has a windshield 10, wiper 12, hood 14, cowl 16, instrument board 18, foot board 20 and steering post 22.

Hood 14 overlaps cowl 16, as illustrated in Fig. 1, and as is usually the custom, a pad 24 of resilient, fibrous material is interposed between the overlapping portions of hood 14 and cowl 16 to eliminate friction, squeaking and to seal the joint. The liquid to be applied to the windshield is carried in a reservoir 26 held in a bracket 28 which is secured to post 22 by clamp 30. A pipe line extends from reservoir 26 and constitutes two lengths of hose 30 and 32, a flattened conduit 34, and a flexible tube 36. A pump 38 is provided to force liquid from reservoir 26 to the later described nozzle assembly, and this pump serves in the manner set forth in my co-pending application and also as known in the art, for example as shown in Patent No. 1,502,821, issued July 29, 1934. Pump 38 is supported by instrument board 18 through the medium of a clamp 40.

Reference to Fig. 7 will readily indicate the manner in which flattened tube 34 serves to allow the passage of the pipe line outwardly from beneath hood 14 to above cowl 16. The flattened tube 34 compresses material 24 to provide space for its passage, and a laterally extending portion 42 offsets this flattened conduit 34 sufficiently to allow it to pass through the joint as illustrated in Fig. 1. Manifestly, this manner of conducting the liquid out from beneath the hood obviates the necessity of drilling holes, and a highly desirable structure results.

Flexible tube 36 may be of any length so as to permit positioning the nozzle assembly at the desired place, either upon the outer face of hood 14, cowl 16 or windshield 10. A rigid pipe 44 is in connection with the outer end of tube 36 and forms a part of the nozzle assembly. One end of pipe 44 is provided with a nozzle element 46, having a hole 48 for the passage of the liquid. Pipe 44 is longitudinally arched, as shown in Figs. 2 and 5, and is held in place by cap 50 that is removably mounted upon one side of a rubber suction cup 52. This suction cup is of conventional type, has a threaded stem 54 anchored therein on the axis thereof so that cap 50 might be rotated about said axis. Cap 50 has an annular wall 56 provided with openings 58 disposed as shown in Fig. 5 so as to receive pipe 44. Pipe 44 extends to each side of cap 50 and between the annular wall 56 thereof and boss 58 integral with cup 52. The outer annular face of boss 58 is tangent to the side of pipe 44 and when head 60 is loosened, cap and pipe 50 and 44 respectively will move around the axis of cup 52. When head 60 is tightened, cap 50 will move against the outer face of cup 52 and pipe 44 will be engaged by the edges of the annular wall 56 at holes 58 and be forced against cup 52 as seen in Figs. 3 and 4.

Longitudinally arching pipe 44 allows for further adjustment by rotating the pipe about its axis when head 60 is loosened. After cup 52 has been positioned, the direction of travel of liquid being projected through hole 48 may be varied as desired.

The method of attachment, mode of operating and advantages of a windshield sprayer and nozzle assembly of the character contemplated by this invention are apparent from the foregoing specification.

Having thus described the invention, what is claimed as new and desired to be secured by Letters Patent is:

1. A windshield sprayer for automobiles, having a hood and cowl, comprising a reservoir; a nozzle adjacent to the windshield; and a pipe line interconnecting the reservoir and nozzle extending between the hood and cowl said pipe line being flexible and provided with a rigid section therein forming that portion of the pipe line between said hood and the cowl.

2. A windshield sprayer for automobiles, having an overlapping hood and cowl, comprising a reservoir; a nozzle adjacent to the windshield; and a pipe line having a rigid, flattened section therein interconnecting the reservoir and nozzle extending between the hood and cowl, said rigid, flattened section being between the overlapped portion of the hood and said cowl.

3. A windshield sprayer for automobiles, having an overlapping hood and cowl and a pad of yieldable fibrous material between the overlapping portions of the hood and cowl, comprising a reservoir below the hood; a nozzle adjacent to the windshield above the cowl; and a pipe line interconnecting the reservoir and nozzle extending between the overlapping portions of the hood and cowl, said pad being compressed by the pipe line to provide space for the latter as the hood and cowl remain in normal relative positions.

4. A windshield sprayer for automobiles, having an overlapping hood and cowl and a pad of yieldable fibrous material between the overlapping portions of the hood and cowl, comprising a reservoir below the hood; a nozzle adjacent to the windshield above the cowl; and a pipe line interconnecting the reservoir and nozzle extending between the overlapping portions of the hood and cowl, said pad being compressed by the pipe line to provide space for the latter as the hood and cowl remain in normal relative positions, said pipe line being flattened at the zone of contact with said pad.

5. A windshield sprayer for automobiles, having an overlapping hood and cowl and a pad of yieldable fibrous material between the overlapping portions of the hood and cowl, comprising a reservoir below the hood; a nozzle adjacent to the windshield above the cowl; and a pipe line interconnecting the reservoir and nozzle extending between the overlapping portions of the hood and cowl, said pad being compressed by the pipe line to provide space for the latter as the hood and cowl remain in normal relative positions, the length of said pipe line extending between the hood and cowl being flattened and offset for the purpose specified.

6. A windshield sprayer for automobiles, having an overlapping hood and cowl and a pad of yieldable fibrous material between the overlapping portions of the hood and cowl, comprising a reservoir below the hood for the liquid to be sprayed; a nozzle adjacent to the windshield above the cowl; a flexible pipe line interconnecting the reservoir and nozzle having a rigid section therein extending between the hood and cowl at the overlapping portions thereof; and means in connection with the pipe line for drawing liquid from the reservoir and forcing it through the nozzle, said rigid section being flat in cross section and having a laterally extending length therein intermediate its ends whereby the said pad is compressed to provide space for the pipe line as the hood and cowl remain in normal relative positions and the pipe line is projected upwardly from below the hood to above the cowl.

CLARENCE E. STOW.